April 17, 1928.  W. L. PITT  1,666,350
DUSTING APPARATUS
Filed Feb. 9, 1925
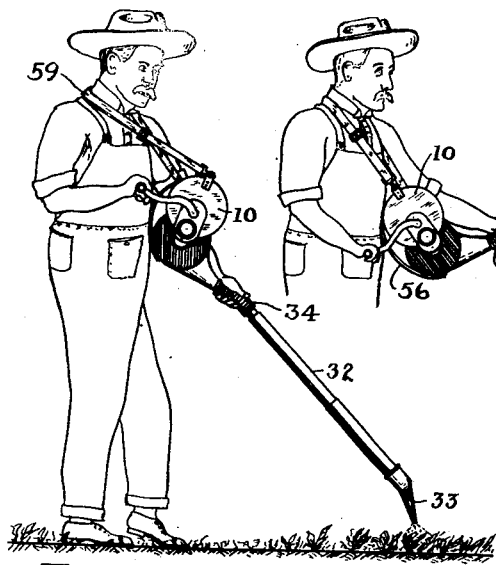
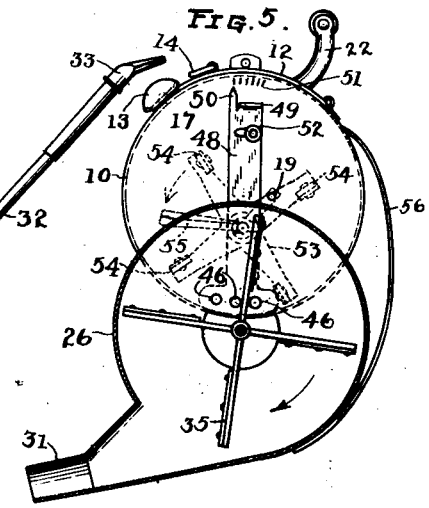
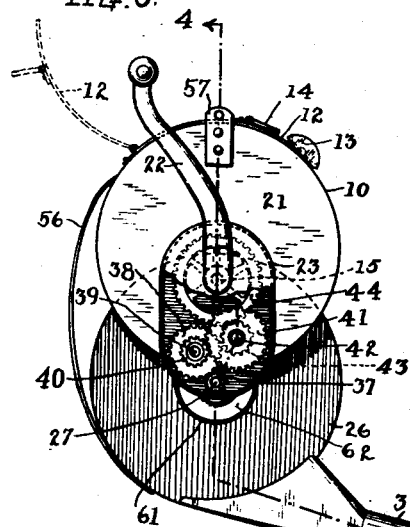
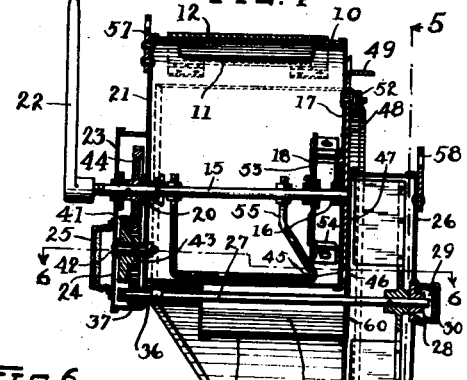
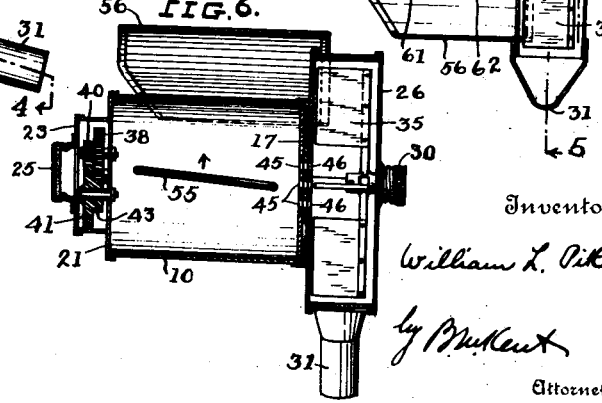
Inventor
William L. Pitt
Attorney Patented Apr. 17, 1928.

1,666,350

UNITED STATES PATENT OFFICE.

WILLIAM L. PITT, OF CLEVELAND, OHIO.

DUSTING APPARATUS.

Application filed February 9, 1925. Serial No. 7,918.

This invention relates to the type of dusting apparatus that is used for spraying vegetation with insecticides in powder form.

It is one of the objects of the invention to provide an apparatus of simple construction that may be manufactured at a comparatively low cost and sold at a popular price and yet embody all of the features that are essential to an efficient and conveniently operable apparatus. A further object of the invention is to provide apparatus of this type that may be conveniently carried by an operator and which may be easily adjusted to and supported in different positions on the body of the operator, in order to meet the requirements for spraying different kinds of vegetation.

Other objects of the invention and the features of novelty will be apparent from the following description taken in connection with the accompanying drawings, of which:

Figure 1 is a side elevation of an apparatus embodying my invention, shown in one of the positions in which it may be conveniently carried and operated;

Fig. 2 is a view similar to Fig. 1 but showing the apparatus in another position on the body of the operator;

Fig. 3 is an enlarged side elevation of a portion of the apparatus shown in Fig. 1, certain parts being shown in section;

Fig. 4 is a longitudinal section on the line 4—4 of Fig. 3;

Fig. 5 is a transverse section on the line 5—5 of Fig. 4; and

Fig. 6 is a longitudinal section on the line 6—6 of Fig. 4.

Referring to the drawings, which illustrate a preferred form of my invention, 10 indicates a cylindrical container for the insecticide material. This container is arranged with its axis in a horizontal position and is provided with an opening 11 at the top through which the container may be charged. The opening 11 is normally closed by a hinged cover plate 12 that is held in position by a button 13 and has a ring 14 on its upper surface by which the cover may be conveniently opened.

A shaft 15 extends through the container 10 parallel with the axis thereof but spaced toward the bottom of the container. The shaft 15 is supported at one end by a bearing 16 which is secured to the end wall 17, of the container 10, and supplied with lubricant by means of a duct 18 which extends to the opening 19 in the end wall 17. A bearing 20, for the shaft 15, is arranged in the end wall 21 of the container and on the exposed end of the shaft there is a crank 22. A gear casing 23 is carried on the exterior of the wall 21 and has an opening 24 through which the lubricant may be supplied to the gearing and which is preferably large enough to give access to the gears. The opening 24 is closed by a screw cap 25. A fan or impeller casing 26 is secured to the wall 17 of the container and a shaft 27, arranged parallel with the shaft 15 and below the container 10, has one end supported in the bearing 28 that is carried by the side wall of the casing 26. A short tube 29 is secured on the casing 26 and surrounds the bearing 28 so as to provide a chamber for lubricant which is closed by the screw cap 30. The casing 26 is formed with a tubular discharge connection 31 to which a pipe 32 may be attached, this pipe having a suitable nozzle 33 on the outer end thereof and having a flexible section 34 at its inner end, for attachment to the connection 31 and to permit the pipe to be adjusted to different positions in order to accommodate the apparatus to the height and character of the vegetation that is to be sprayed.

An air-impeller 35 is carried by the shaft 27, within the casing 26. This impeller may be of any preferred form that will produce the necessary air blast. The shaft 27 is also supported in the bearing 36 and carries a pinion 37, within the gear casing 23. The pinion 37 meshes with a gear 38 on the stub shaft 39. A pinion 40 is rigidly connected with the gear 38, to rotate therewith, and meshes with a gear 41 on the stub shaft 42. The gear 41 has a pinion 43 rigidly connected so as to rotate therewith and this pinion meshes with and is driven by a gear 44, on the shaft 15. The arrangement of gears, thus described, provides for driving the shaft 27, on the shaft 15, at a greatly increased speed and in practice, I have used gear ratios which would give a speed increase of 46 to 1, although other speed ratios may be used.

The wall 17 is provided, adjacent the lower corner of the container 10, with a plurality of discharge openings 45 through which the insecticide material may be discharged into the impeller casing and I have shown three of these openings, there also being similar openings in alignment therewith through the wall of the casing 26, as indicated at 46, in Fig. 5. The wall 47, of the casing 26, which adjoins the wall 17, is spaced sufficiently therefrom to provide for a valve member 48 that is pivotally mounted on the end of the shaft 15 and, at its lower end, has openings that are adapted to be aligned with the openings 45 and 46. The upper end of the member 48 has a handle 49 and a pointer 50, the latter cooperating with graduations 51, on the wall 17, to indicate the settings of the valve member 48 for the purpose of regulating the flow through the discharge openings 45 and 46, it being understood that by swinging the member 48 about the shaft 15 the openings in the lower end of the member 48 may be carried more or less out of alignment with the openings 45 and 46 and thus restrict the flow of material therethrough or entirely stop it. A thumb nut 52 is provided for the purpose of clamping the member 48 in any position to which it is adjusted.

A scraping device is arranged on the shaft 15, within the container 10, and consists of a spider 53 having a plurality of arms, the outer ends of which are provided with pads 54 that are adapted to run against or in close proximity to the inner surface of the wall 17, these pads being so located that they pass over the openings 45 and prevent the material from packing around these openings and thereby interrupting the discharge through the openings. A feeding device consisting of a U-shaped rod 55 is carried by the shaft 15 and revolves in close proximity to the bottom of the container 10 and, as will be seen from Fig. 6, is slightly inclined with respect to the axis of the container so as to have a tendency to feed the material toward the openings 45.

A curved shield 56 has its upper end secured to the rear side of the container and its lower end secured to the casing 26 and, as will be seen from Figs. 1 and 2, permits the apparatus to be conveniently supported in different positions, against the body of the operator, the curvature of this shield permitting somewhat of a rocking movement of the apparatus.

An ear 57 is secured to the wall 21 and an ear 58 is secured to the casing 26. A suitable strap 59 has its ends connected with the ears 57 and 58 and is adapted to support the apparatus from the shoulders of the operator, the shield 56 cooperating with the strap 59 to hold the apparatus in a desired position.

There is an intake opening 60 in the wall 47, directly below the opening 46 and a curved plate 61 surrounds this opening and cooperates with the bottom of the container 10 to form a tubular passage 62 through which the air is supplied to the intake opening 60.

In the operation of the apparatus the crank 22 is rotated by the operator which causes the impeller 35 to rotate in the casing 26 and create a blast of air which is drawn into the casing through the opening 60 and discharged through the connection 31. It will be observed that the openings 46, through which the insecticide material is discharged from the container 10, are arranged so that the material will fall into the current of air as it is drawn into the impeller and, since the discharge connection 31 is at the lower side of the casing 26, the apparatus operates efficiently to thoroughly mix the material with the air and to cause it to be carried out through the pipe 32.

Having thus described my invention, what I claim is:

1. In dusting apparatus, the combination of a material container having a substantially vertical side wall with a discharge opening for the material adjacent the bottom thereof, a shaft extending through said container and provided with means for feeding the material to said opening and, exteriorly of the container, with a crank whereby the shaft may be rotated, a shaft arranged parallel with the first-mentioned shaft and having an impeller arranged adjacent said wall with its intake alongside said opening, a casing enclosing said impeller and having an air intake opening below said container and through which air is admitted to said casing independently of the material, a wall surrounding said intake opening and cooperating with the bottom wall of said container to form a tubular passage through which air is supplied to said intake opening, gearing arranged on the exterior of said container for driving the impeller shaft from the first-mentioned shaft, a casing for said gearing carried on a wall of said container, an exteriorly adjustable valve pivoted on the first-mentioned shaft and cooperating with said discharge opening to regulate the flow of material therethrough, and means whereby the apparatus may be supported on the body of an operator.

2. In dusting apparatus, the combination of a material container of cylindrical form arranged with its axis horizontal, a shaft extending through said container parallel of the axis thereof but spaced therefrom toward the bottom of the container, said container having a discharge opening adjacent a lower corner thereof, a valve for controlling the discharge of material through said opening, a scraper on said shaft for preventing the material from packing around said opening, a feeding device on said shaft arranged to revolve in close proximity to the bottom of said container to move the material toward said opening, said feeding device projecting into the path of said scraper, a shaft arranged parallel with the first-mentioned shaft below said container and carrying an impeller alongside of one of the end walls of the container, a casing for said impeller secured on said end wall and having an air intake opening on the side adjacent said wall so arranged that the material from said discharge opening falls into the current of air passing through said intake opening, a wall surrounding said intake opening and cooperating with the bottom of said container to form a tubular intake passage through which air is delivered to said intake opening independently of the material, gearing whereby the second-mentioned shaft is driven by the first shaft located on the outer side of the other end wall of said container, a casing for said gearing carried by the latter wall, and a crank on the first-mentioned shaft.

In testimony whereof I affix my signature.

WILLIAM L. PITT.